A.V.C. SYSTEM FOR LOW PLATE VOLTAGE OPERATION
Filed Aug. 6, 1957
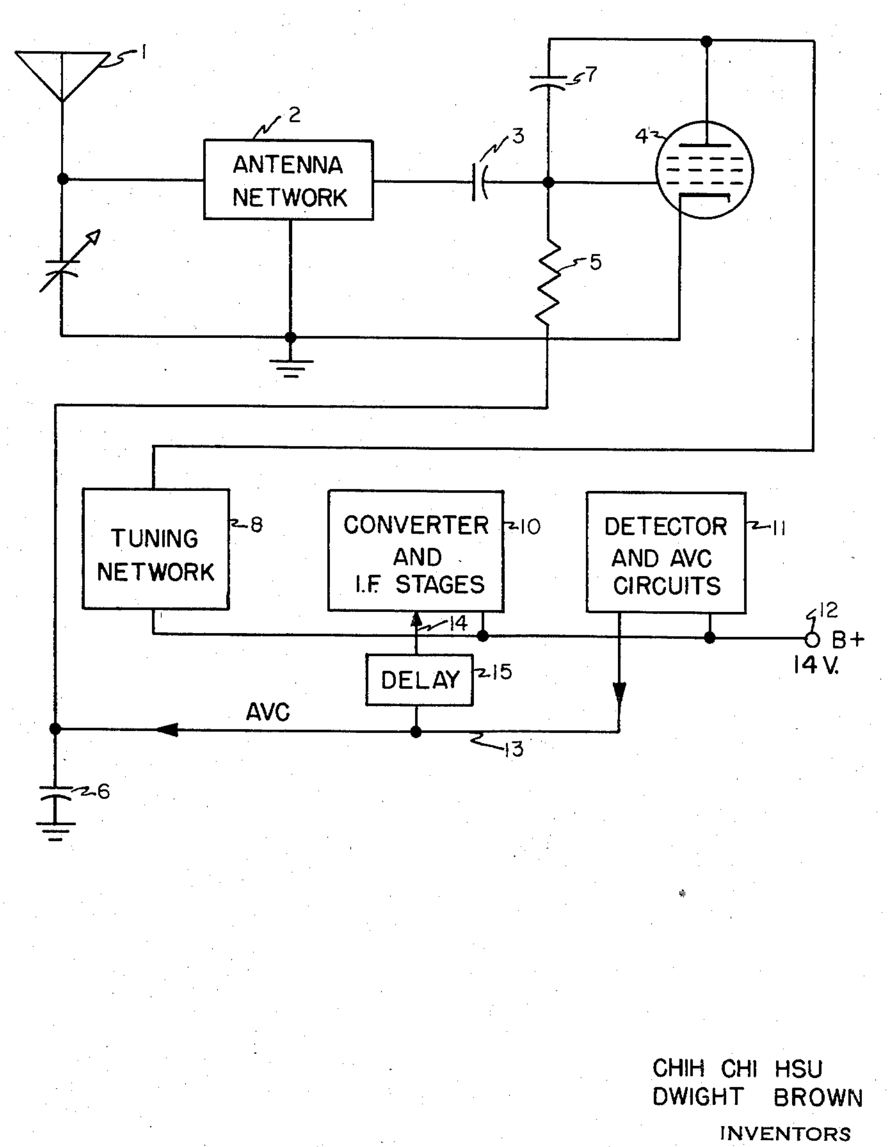
CHIH CHI HSU
DWIGHT BROWN
INVENTORS
BY Hillman and Kerst
ATTORNEYS

United States Patent Office 2,971,163

Patented Feb. 7, 1961

2,971,163

A.V.C. SYSTEM FOR LOW PLATE VOLTAGE OPERATION

Chih Chi Hsu, Baltimore, and Dwight Brown, Baltimore County, Md., assignors to The Bendix Corporation, a corporation of Delaware Filed Aug. 6, 1957, Ser. No. 676,658

2 Claims. (Cl. 330—133)

This invention relates to the prevention of distortion in radio receiving circuits which are required to operate with low plate voltages.

In the ordinary radio receiving circuit utilizing a plate voltage in the order of hundreds of volts, distortion is successfully prevented by the use of automatic volume control (AVC) circuits feeding back rectified signal voltage in a degenerative sense as bias voltage to the R.F. amplifier, frequency converter and I.F. amplifier stages.

In some situations, however, it is necessary to operate a receiving circuit on plate supply voltages of the order of 10 volts. This may be true, for example, in radio receivers employing a combination of vacuum tubes and transistors.

While tubes have been developed which will operate on plate voltages of this magnitude, their cut off characteristics are sharpened causing their signal handling capabilities to be low. As a practical matter, tubes designed for this service are so constructed that the control potential required to reduce their gain to the conventional low limit of about 10 micromhos is of the same order of magnitude as the plate and screen potential. This is done, of course, to minimize the curvature of the characteristic traversed by the larger signals and thus minimize the distortion, just as in the case of the familiar higher voltage super-control tubes.

Although in the usual set the distortion which would otherwise occur in the final stages of the I.F. amplifier can be avoided by proper proportioning of AVC signal to the various stages, this appears to be very difficult, if not impossible, to accomplish in low plate supply voltage circuits since an increase in AVC voltage to a tube still further reduces its already low signal handling capability. The fact that the AVC voltage is of the same order as the plate supply voltage adds greatly to the difficulty of the solution.

It is an object of the invention to reduce distortion in radio receiving circuits operating on low values of plate supply voltage by simple means which does not add to circuit complexity.

This and other objects and advantages of the invention are realized by a circuit in which sufficient AVC voltage is applied to the first tube of the receiver circuit to cut it off completely before the signal level becomes large. For larger signals, the first tube is then so biased that there is no conduction even on the peak of the signal and the signal is transmitted to the second stage by feed through capacity.

The single figure of the drawing is a schematic diagram of a circuit embodying the invention.

Referring more particularly to the drawing, there is shown a radio receiver circuit comprising an antenna 1, coupled by way of an antenna network 2 and a capacitor 3 to the control grid of an R.F. amplifier tube 4. The control grid is connected to ground by way of a resistor 5 and a capacitor 6 in series. The plate of tube 4 is connected to the control grid by a capacitor 7. The plate is also connected by way of a tuning network 8 to a converter and subsequent I.F. stages represented by the box 10. The latter feeds a detector and AVC circuit arrangement indicated by the box 11.

Plate supply voltage for the various stages is derived from the positive terminal 12 of a source of D.C. voltage indicated by way of example, as having a value of 14 volts.

AVC voltage is applied by way of a conductor 13 to the junction of resistor 5 and capacitor 6, and by a branch conductor 14 and delay means 15 to the converter and I.F. stages.

In the operation of the above circuit sufficient AVC voltage is applied to the first stage to completely cut it off before the signal level becomes large. The first tube is biased by this voltage to such an extent that it does not conduct, even on the peak of the signal, and the signal is transmitted to the following stages by way of the feed through capacity of capacitor 7. This may be an actual capacitor or the tube 4 may be designed with sufficient plate to grid capacity as to establish a virtual capacitor of the desired value, or the capacity may be a part of the printed circuit layout.

Because the tube must be cut off while the signal is relatively small, the AVC loop gain should be large. To obtain this result, the AVC voltage applied to the converter and the I.F. stages may be delayed and of different magnitude. The delay expedient is indicated by the drawing. Dividing this voltage produces a similar result due to the shape of the cut-off characteristic of the tube. The amount of feed-through capacity should be adjusted to fit the signal handling ability of the remainder of the receiver. The first tube 4 is advantageously one designed to have a sharp cut-off at a small grid bias so that the AVC loop gain will be maximized and cut-off will occur with a very small signal applied to its signal grid.

This practice is directly contrary to all the known art developed by a multitude of workers during the past three decades. As described herein, it represents the embodiment of the discovery that the cut-off region of a tube may be traversed by a sufficiently small signal with only a small rise in distortion and even this is evident only over a small range of signal levels, provided only that the current through a parallel path, here represented by the capacitor 7, is sufficiently large compared to the small value of tube signal current, and is properly phased.

As an example, if the current through the capacitor 7 produces a potential across the tuning network 8 having a magnitude nine times as great as the potential due to the tube space current along under the conditions where the signal applied to the tube 4 traverses the cut-off, the distortion due to the cut-off traversal must be less than 1% total distortion products at the worst level.

In actual practice the ratio between the signal currents through the two parallel paths may be much closer to unity under these conditions without incurring disturbing distortion, and also, it must be recalled that weaker radio signals are generally subject to so much variation in level that they rarely remain in the region of maximum distortion long enough for even 10% distortion to become obnoxious. However, in commercial practice it has been found desirable to design for the proportions first mentioned to avoid the necessity of an accurate measurement of the transmission through the passive path.

The significance of the phase relations between the currents transferred by the parallel active and passive paths depends upon phase inversion in the active element. In a typical input amplifier, the signal seen at its output will be approximately in anti-phase to the input signal, with deviations from this condition due to mistuning and differences in loss factors of the tuned input and output circuits normally not greater than perhaps 30° to 40°.

If a substantially resistive passive path were to be used in parallel with such a phase inverting amplifier, there would exist at some low signal level nearly equal and opposite transfer functions for the undistorted portion of the signal, leaving distortion products in the ascendency, or equally undesirable, a condition where the carrier would be reduced below its normal value relative to the sidebands. This can be avoided by a substantially reactive passive path such as to produce a phase rotation of the transfer function for the passive path toward a quadrature relation with the transfer function for the active element of the amplifier.

If the active element of the amplifier is a non-inverting form, such as the space-current path of a vacuum tube in grounded-grid or cathode-follower configuration, the problem is unlikely to exist since it would appear only if a phase inverting passive coupling were to be used. Hence, resistive coupling might be found desirable in this case, but the reactive couplings would still be operative in their simplest forms.

Obviously, the same considerations apply to receivers employing transistors in the early stages where it is desirable to operate the transistors on very low potentials and with small currents to minimize noise generation.

What is claimed is:

1. In a radio receiver having a first amplifier stage and one or more subsequent cascaded amplifier stages and means for deriving an automatic gain control potential from said subsequent stages to reduce the gain of a plurality of said stages, the combination comprising means for applying said potential to bias said first stage to cut-off in response to an initial predetermined level of said potential, means for delaying application of said potential to said subsequent stages until said first stage has been substantially cut-off by said potential, and a passive coupling means connected between the input and output of said first stage for by-passing signals when said first stage is cut-off to produce at said output signals which are substantially in quadrature phase relation with signals at said output transferred by said first stage and having a magnitude such that said quadrature phase signals passed by said coupling means exceed the magnitude of signals transferred to said output by said first stage when said potential is in the vicinity of cut-off for said first stage at which maximum distortion is introduced.

2. In a radio receiver having a first amplifier stage and one or more subsequent cascaded amplifier stages and means for deriving an automatic gain control potential from said subsequent stages to reduce the gain of a plurality of said stages, the combination comprising means for applying said potential to bias said first stage to cut-off in response to an initial predetermined level of said potential, means for delaying application of said potential to said subsequent stages until said first stage has been substantially cut-off by said potential, and a passive coupling means connected between the input and output of said first stage for by-passing signals when said first stage is cut-off to produce at said output signals which exceed the signals transferred to said output by said first stage when said potential is in the vicinity of cut-off for said first stage at which maximum distortion is introduced.

References Cited in the file of this patent

UNITED STATES PATENTS

| | | |
|---|---|---|
| 2,200,062 | Groeneveld | May 7, 1940 |
| 2,204,216 | Harnett et al. | June 11, 1940 |
| 2,243,423 | Hollingsworth | May 27, 1941 |
| 2,597,520 | O'Brien | May 20, 1952 |
| 2,810,071 | Race | Oct. 15, 1957 |
| 2,834,877 | Milwitt | May 13, 1958 |
| 2,873,361 | Pepperberg | Feb. 10, 1959 |